United States Patent
Sipila

(10) Patent No.: US 11,105,936 B2
(45) Date of Patent: Aug. 31, 2021

(54) GAS DRIFT DETECTOR

(71) Applicant: HEIKKI SIPILA OY, Espoo (FI)

(72) Inventor: Heikki Johannes Sipila, Espoo (FI)

(73) Assignee: Heikki Sipila OY, Espoo (FI)

( * ) Notice: Subject to any disclaimer, the term of this patent is extended or adjusted under 35 U.S.C. 154(b) by 45 days.

(21) Appl. No.: 16/615,977

(22) PCT Filed: Jun. 20, 2017

(86) PCT No.: PCT/FI2017/050460
§ 371 (c)(1),
(2) Date: Nov. 22, 2019

(87) PCT Pub. No.: WO2018/234610
PCT Pub. Date: Dec. 27, 2018

(65) Prior Publication Data
US 2020/0096653 A1    Mar. 26, 2020

(51) Int. Cl.
*G01J 1/48* (2006.01)
*G01T 1/185* (2006.01)
*H01J 47/02* (2006.01)
*G01T 1/36* (2006.01)

(52) U.S. Cl.
CPC .............. *G01T 1/185* (2013.01); *H01J 47/02* (2013.01); *G01T 1/36* (2013.01)

(58) Field of Classification Search
CPC .. G01T 1/185; G01T 1/02; G01T 1/36; G01T 1/17; G01T 1/247; G01T 1/241; H01J 47/02; H01J 47/06
See application file for complete search history.

(56) References Cited

U.S. PATENT DOCUMENTS

| 4,254,033 A | 3/1981 | Willem et al. |
| 4,804,847 A | 2/1989 | Uber, III |
| 6,362,484 B1 | 3/2002 | Beyne |
| 2003/0178572 A1 | 9/2003 | Takahashi |
| 2005/0194541 A1 | 9/2005 | Clark |

(Continued)

FOREIGN PATENT DOCUMENTS

WO    0225313 A1    3/2002

OTHER PUBLICATIONS

International Search Report and Written Opinion for PCT/FI2017/050460 dated Nov. 2, 2017.

(Continued)

*Primary Examiner* — David P Porta
*Assistant Examiner* — Mamadou Faye
(74) *Attorney, Agent, or Firm* — Thomas|Horstemeyer LLP

(57) ABSTRACT

The invention relates to a gas drift detector (100) comprising: a chamber formed by: a housing (102) having a first end and a second end; a radiation window (104) arranged to cover an opening of the first end of the housing (102); and a substrate (106) arranged to cover an opening of the second end of the housing (102), an anode (110) arranged to the substrate (106), one or more conductive rings (108) arranged on a surface (106a) of the substrate facing inside the chamber, and an amplifier (112) arranged to the opposite surface (106b) of the substrate than the conductive rings (108). The amplifier (112) is electrically connected to the anode (110). The chamber is filled with a gas.

13 Claims, 3 Drawing Sheets

(56) References Cited

U.S. PATENT DOCUMENTS

2010/0252744 A1    10/2010  Herrmann et al.
2012/0018642 A1*   1/2012   Fukuda .................... G01T 1/28
                                                      250/361 R

OTHER PUBLICATIONS

Carita, L., et al. Quenched and non-quenched Ar—Xe Penning mixtures as detection media for a Gridded-Microstrip Gas Chamber X-ray detector. Nuclear Science Symposium Conference Record, 2008, Piscataway, NJ, USA: IEEE, Oct. 19, 2008, pp. 902-907.
Second Written Opinion for PCT/FI2017/050460 dated Jul. 5, 2019.
International Preliminary Report on Patentability for PCT/FI2017/050460 dated Sep. 18, 2019.

* cited by examiner

GAS DRIFT DETECTOR

CROSS-REFERENCE TO RELATED APPLICATIONS

This application is the 35 U.S.C. § 371 national stage application of PCT Application No. PCT/FI2017/050460, filed Jun. 20, 2017, which is herein incorporated by reference in its entirety.

TECHNICAL FIELD

The invention concerns in general the technical field of X-ray detectors. Especially the invention concerns gas-based X-ray detectors.

BACKGROUND

Typically, an X-ray detector may be used for example in X-ray spectrometry or in electron microscopy. Probably the most important parameters of X-ray detectors are noise performance, i.e. energy resolution, and active area. Preferably, the energy resolution should be as good, i.e. low, as possible and the active area as large as possible. However, these two parameters are typically contradictive and very difficult to realize in the same X-ray detector.

According to one prior art solution the X-ray detector may be implemented as a silicon drift detector (SDD). There are commercially available SDDs from several manufacturers. The SDDs have low noise performance, i.e. energy resolution, but the active area of the SDD is small. Typically, the energy resolution of the SDD may be around 125 eV and the active area of the SDD may be from 10 to 100 mm$^2$. Furthermore, one drawback of SDD is that they are expensive to manufacture.

According to another prior art solution the X-ray detector may be implemented as a gas-filled detector, i.e. proportional counter. In the recent decades the use of the gas-filled detectors as the X-ray detector is minor mainly due to the market dominance of SDD systems. Typically, the proportional counter comprises a cylindrical shaped cathode tube and an anode wire travelling substantially along the center axis of the cathode tube. The tube is filled by a gas, such as argon or xenon, for example. The anode wire is positively biased in relation to the cathode. Because of the electrical field created inside the tube the electrons created by an X-ray event drift towards the anode wire and the positively charged ions created by said X-ray event drift towards the cathode. In the immediate vicinity of the anode wire the electrical field strength is so large that it creates secondary ionization, i.e. avalanche phenomenon, causing that the number of the electrons multiplies. The region where the secondary ionization occurs may be called as gas amplification region, i.e. avalanche region. The positive ions drift from this gas amplification region towards the cathode and movement of the positive ions induce a signal to a front amplifier of the proportional counter.

The proportional counters have high noise performance, i.e. energy resolution, because of high (e.g. from 0.6 to 0.9) variance of the gas amplification. Typically, the energy resolution of the proportional counter may be approximately between 820 eV and 1060 eV. However, the proportional counter may have large active area. Typically, the active area of the proportional counter may be tens of even hundreds of cm$^2$. One advantage of the gas-filled detectors in comparison to SDDs is that they are inexpensive to manufacture.

SUMMARY

An objective of the invention is to present a gas drift detector. Another objective of the invention is to provide the gas drift detector having a large active area and low noise properties, i.e. energy resolution.

The objectives of the invention are reached by a gas drift detector as defined by the respective independent claim.

According to a first aspect, a gas drift detector is provided, wherein the gas drift detector comprising: a chamber formed by: a housing having a first end and a second end; a radiation window arranged to cover an opening of the first end of the housing; and a substrate arranged to cover an opening of the second end of the housing, an anode arranged to the substrate, one or more conductive rings arranged on a surface of the substrate facing inside the chamber, and an amplifier arranged to the opposite surface of the substrate than the conductive rings, wherein the amplifier is electrically connected to the anode, wherein the chamber is filled with a gas.

The amplifier may be electrically connected to the anode by means of a bonding wire having length less than 10 mm.

The gas may be one of the following: xenon; krypton; or argon, or a mixture of hydrocarbon and one of the following: xenon, krypton, or argon.

The chamber may comprise one or more inlets for providing the gas inside the housing.

The material of the radiation window may comprise at least one of the following: polymer, aluminium, titanium, beryllium. Furthermore, the material of the substrate may comprise at least one of the following: alumina, polymer.

The amplifier may be one of the following: FET amplifier, MOSFET amplifier.

The one or more conductive rings may be in a form of concentric rings.

The one or more conductive rings, the housing, and the radiation window may be configured to be biased by means of high negative voltage from −500 V to −300 V and a resistive voltage divider in order to drift electrons created by an X-ray event to the anode and to drift the positively charged ions created by said X-ray event to the negatively biased housing.

The gas drift detector may further comprise a second housing for accommodating the chamber, wherein the second housing may be electrically grounded and hermetically sealed.

The diameter of the anode may be less than 0.5 mm. Furthermore, the capacitance of the anode may be less than 1 pF.

The anode may further be encircled with a material having volume resistivity higher or equal to 2·10$^9$ MΩcm and dielectric constant less or equal to 2.5.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
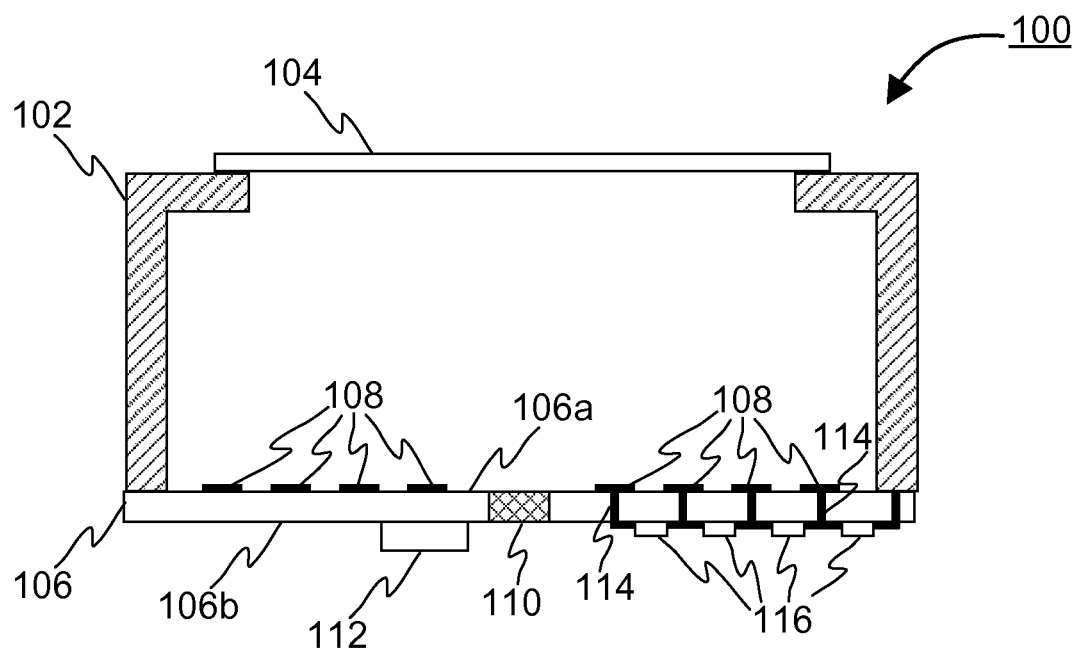
FIG. 1 illustrates schematically an example of a gas drift detector according to the invention.

FIG. 1 illustrates schematically an example of a gas drift detector 100 according to the invention. The gas drift detector 100 according to the invention is gas-based detector, but the structure of the gas drift detector according to invention resembles rather the structure of a silicon drift detector (SDD). The gas drift detector 100 according to the invention comprises a chamber formed by a housing 102, a radiation window 104, and a substrate 106. The gas drift detector 100 further comprises an anode 110, one or more conductive rings 108, and an amplifier 112. The chamber is filled with a gas. The gas may be one of the following: xenon, krypton, argon. Alternatively or in addition, the gas may be any mixture of one of the above listed gases and hydrocarbon, such as methane, acetylene, isobutane. Some examples of the gas mixtures may be 95% argon with 5% methane mixture P-5 (Ar—$CH_4$), 99%-99.5% argon with 0.5%-1% acetylene mixture (Ar—$C_2H_2$).

The housing 102 has a first end and a second end. The radiation window 104 is arranged to cover an opening of the first end of the housing 102 and the substrate 106 is arranged to cover an opening of the second end of the housing 102. The radiation window 104 shall be such a structure that is transparent to X-rays. Furthermore, the radiation window 104 may comprise one or more layers. The material of the radiation window 104 may comprise at least one of the following: polymer, aluminium, titanium, beryllium. For example the radiation window 104 may comprise polymer layer that is coated with aluminium layer on the side of the radiation window 104 facing inside the chamber. The thickness of the radiation window 104 may be for example between 3 and 10 μm. According to one example, the radiation window 104 may comprise the polymer layer having thickness between 3 and 10 μm coated with aluminium layer having thickness of 100 nm.

The material of the housing 102 may be such that provides a strong and robust structure for the chamber. The material of the housing 102 may be for example one of the following: aluminium, stainless steel. The material of the housing 102 may be such that the attachment of the radiation window 104 and the substrate 106 to the housing is enabled. The attachment of the radiation window 104 to the housing may be provided by means of one of the following:

soldering, clueing. Alternatively or in addition, the attachment of the substrate 106 to the housing 102 may be provided by means of one of the following: soldering, clueing. The opening of the first end of the housing 102, which is covered by the radiation window 104, may have diameter smaller or equal than the diameter of the housing 102. In the example illustrated in FIG. 1 the diameter of the opening of the first end of the housing 102 is smaller than the diameter of the housing, but the invention is not limited to this. The diameter of the radiation window 104 may be defined so that the radiation window 104 covers the opening of the first end of the housing 102. Similarly, the opening of the second end of the housing 102, which is covered by the substrate 106, may have diameter smaller or equal than the diameter of the housing 102. In the example illustrated in FIG. 1 the diameter of the opening of the second end of the housing 102 is equal to the inner diameter of the housing 102, but the invention is not limited to this. The diameter of the substrate 106 may be defined so that the substrate 106 covers the opening of the second end of the housing 102.

The anode 110 may be arranged to the substrate 106. The anode 110 may be arranged to the substrate 106 so that a through hole is provided to the substrate 106 and the anode may be arranged inside the through hole. The anode may extend to a surface 106a of the substrate facing inside the chamber and to the opposite surface 106b of the substrate. The material of the substrate 106 may comprise at least one of the following: alumina, polymer, such as Teflon.

In order to achieve low noise performance, the capacitance of the anode 110 may be small. Preferably, the capacitance of the anode may be less than 1 pF, for example 0.2 pF. Alternatively or in addition, in order to achieve small capacitance the diameter of the anode 110 may be small. Preferably, the diameter of the anode may be less than 0.5 mm. Alternatively or in addition, the anode 110 may be encircled with a material having high volume resistivity and small dielectric constant in order to achieve small capacitance. Preferably, the dielectric constant may be less or equal to 2.5 and the volume resistivity higher or equal to $2 \cdot 10^9$ MΩcm. One example of a material having high volume resistivity and small dielectric constant is Teflon, which may be used to encircle the anode 110.

Figure 2A:
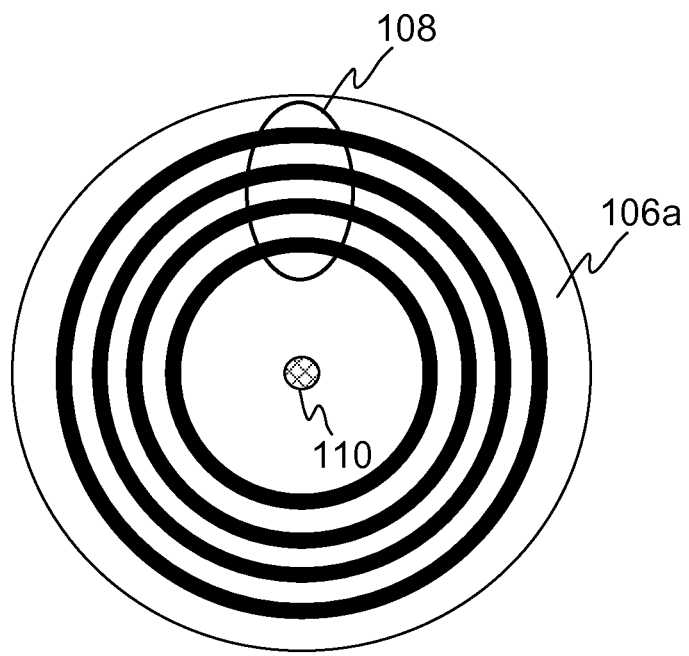
FIG. 2A illustrates schematically an example of the substrate of the gas drift detector according to the invention.

The one or more conductive rings 108 may be arranged on a surface 106a of the substrate facing inside the chamber. The one or more conductive rings 108 may be in a form of concentric rings. The number of the conductive rings 108 is not limited. Thus, the gas drift detector 100 may comprise any number of conductive rings 108. The material of the conductive rings 108 may be any conductive material such as metal or carbon, for example. FIG. 2A illustrates schematically an example of the substrate of the gas drift detector 100 according to the invention viewed towards the surface 106a of the substrate facing inside the chamber. In the example illustrate in FIG. 2A four conductive rings 108 are arranged on the surface 106a of the substrate and the anode 110 is arranged in the middle of the substrate 106. Alternatively, the anode 110 may be arranged any other point of the substrate 106.

Figure 2B:
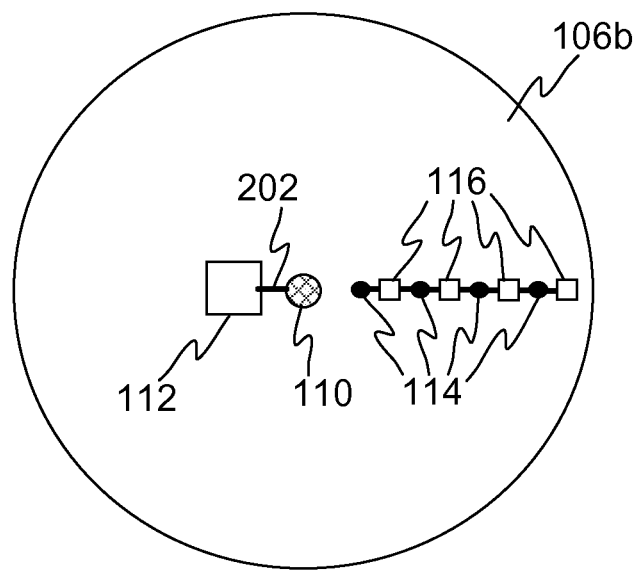
FIG. 2B illustrates schematically another example of the substrate of the gas drift detector according to the invention.

The amplifier 112 may be arranged to the opposite surface 106b of the substrate than the conductive rings 108. In order to achieve low noise, i.e. energy resolution, the amplifier 112 may be one of the following: FET amplifier, MOSFET amplifier. The noise of the FET and MOSFET amplifiers is very low, such as less than 25 eV. The noise of the MOSFET amplifier may be even 8.6 eV. Furthermore, the MOSFET amplifier has a low input capacitance. In addition, the leakage current of the MOSFET amplifier may be close to zero, because of the MOSFET-type input stage. Furthermore, the amplifier 112 is electrically connected to the anode 110. The amplifier 112 may be electrically connected to the anode 110 by means of a bonding wire 202. The bonding wire 202 may have length less than 10 mm in order to improve energy resolution of the gas drift detector. Preferably, the length of the bonding wire 202 may be less than 5 mm in order to achieve low energy resolution and capacitance. Most preferably, the length of the bonding wire may be less between 2 mm and 3 mm in order to achieve low energy resolution and capacitance. FIG. 2B illustrates schematically an example of the substrate of the gas drift detector according to the invention viewed towards surface 106b of the substrate opposite to the surface 106a on which the conductive rings 108 are arranged. FIG. 2B shows one example how the amplifier 112 may be bonded to the anode 110.

In FIGS. 2A and 2B the substrate 106 and thus also the gas drift detector 100 has a circle shape. However, the shape of the gas drift detector 100 is not limited to the circle, but it may have any other shape, for example rectangle, square or ellipse. Preferably, the shape of the gas drift detector 100 is circle.

Next the operation of the gas drift detector 100 according to the invention is described. The electric field inside the gas drift detector 100 is arranged so that the electrons created by an X-ray event will drift rapidly to the anode 110 arranged in the center of the substrate 106 and the slower positively-charged ions created by said X-ray event will drift to the walls of the housing 102. The one or more conductive rings 108, the housing 102, and the radiation window 104 may be biased by means of high negative voltage and a resistive voltage divider arranged to the opposite surface 106b of the substrate than the conductive rings 108 in order to drift the electrons created by the X-ray event to the anode 110 and to drift the positively charged ions created by said X-ray event to the negatively biased walls of the housing 102 The high negative voltage may be from −500 to −300 V, for example. The resistive voltage divider may comprise a through hole 114 from each conductive ring 108 to the opposite surface 106b of the substrate 106 than to which the conductive rings 108 are arranged and a surface mounted component 116, such as a resistor, for each conductive ring 108 as illustrated in FIGS. 1 and 2B. The surface mounted components 116 are connected in series to each other. The conductive ring 108 closest to the anode may be biased near to a virtual ground and the conductive ring 108 closest to the wall of the housing 102 may be biased to the same high negative voltage as the housing 102 in order to provide the electric field inside the gas drift detector 100 so that the electrons created by the X-ray event will drift rapidly to the anode 110 arranged in the center of the substrate 106 and the slower positively-charged ions created by said X-ray event will drift to the walls of the housing 102.

In the gas drift detector 100 the movement of the negative electrons are used for generating a signal to the amplifier 112 of the gas drift detector 100. Thus, the anode 110 to which the electrons are drifted sees mainly only the electron signal. This effect may be called as a small pixel effect. Furthermore, because the electron mobility is three orders of magnitude higher than the mobility of the positive ions, the gas drift detector 100 may be used to generate faster signals than the proportional counters, where the signal is generated from the motion of the positively charged ions.

The energy resolution of a proportional counter may be defined by using the following formula:

$$FWHM_D = 2.35\sqrt{(F+f)WE_\gamma},\qquad(1)$$

where F is Fano factor of the gas mixture, f is the variance of the gas amplification, W is the mean energy for the electron/ion pair creation, and $E_\gamma$ is the energy of the X-ray photon to be measured. The above presented formula may also be used to define the energy resolution of the gas drift detector 100 according to the invention.

In the gas the energy needed for the electron/ion pair creation is approximately 6 to 7 times higher than the energy needed for the electron/ion pair creation in semiconductor, such as in silicon. Typically, the mean energy for the electron/ion pair creation, W, for silicon drift detectors may be approximately 3.6 eV. For the gas mixtures the mean energy for the electron/ion pair creation, W, may typically be between 21-26 eV depending on the used gas mixture. Thus, the generated signal in the gas is approximately ⅐ in comparison to semiconductor. Thus, it is preferable to employ in the gas drift detector according to the invention an amplifier 112 having as low noise as possible. The Fano factor, F, for the silicon drift detectors may typically be approximately 0.1 and for the gas mixtures typically between 0.06-0.2 depending on the used gas mixture. Typically, the comparison of different detectors may be performed at 5.9 keV for the $E_\gamma$.

For example for Ar—CH$_4$ gas mixture F is 0.17 and W is 26 eV. For Xenon, in turn, F is 0.13 and W is 21.5 eV. For Ar—C$_2$H$_2$ mixture F is 0.075 and W is 20.3 eV, for example. In case of the proportional counters the variance of the gas amplification, f, may be from 0.6 to 0.9 depending on the used gas mixtures. Because the noise of the amplifier 112 of the gas drift detector 100 is low, the signal may be amplified without the use of the gas amplification, i.e. f is 0 in case of the gas drift detector. This means that the energy resolution of the gas drift detector according to the invention is significantly better than the energy resolution of the proportional counters. For example, when Ar—CH$_4$ is used as the gas the energy resolution of the gas drift detector 100 according to the invention may be defined to be approximately 380 eV at 5.9 keV by using the above presented formula (1). As a comparison the energy resolution of the proportional counter (f=0.9), when Ar—CH$_4$ is used, may be defined to be approximately 950 eV at 5.9 keV by using the above presented formula.

In order to define the total energy resolution of the gas drift detector 100 according to the invention the noise of the amplifier 112 should also be taken into account. Thus, it is preferable to use a low noise amplifier, such as MOSFET or FET amplifier, as described earlier in this application. The noise of the amplifier 112 may be taken into account by adding the noise contribution of the amplifier 112 quadratically to the defined energy resolution in order to define the total energy resolution of the gas drift detector according to the invention. Thus, the total energy resolution may be defined by using the following formula:

$$e_{tot} = \sqrt{FWHM_D^2 + e_{amp}^2},\qquad(2)$$

where $e_{amp}$ is the noise of the amplifier. For example the noise contribution of a MOSFET amplifier may be estimated to be approximately 50 eV, which in turn leads to a theoretical total energy resolution of 383 eV for the gas drift detector 100 according to the invention defined with the above presented formula (2).

Figure 3:
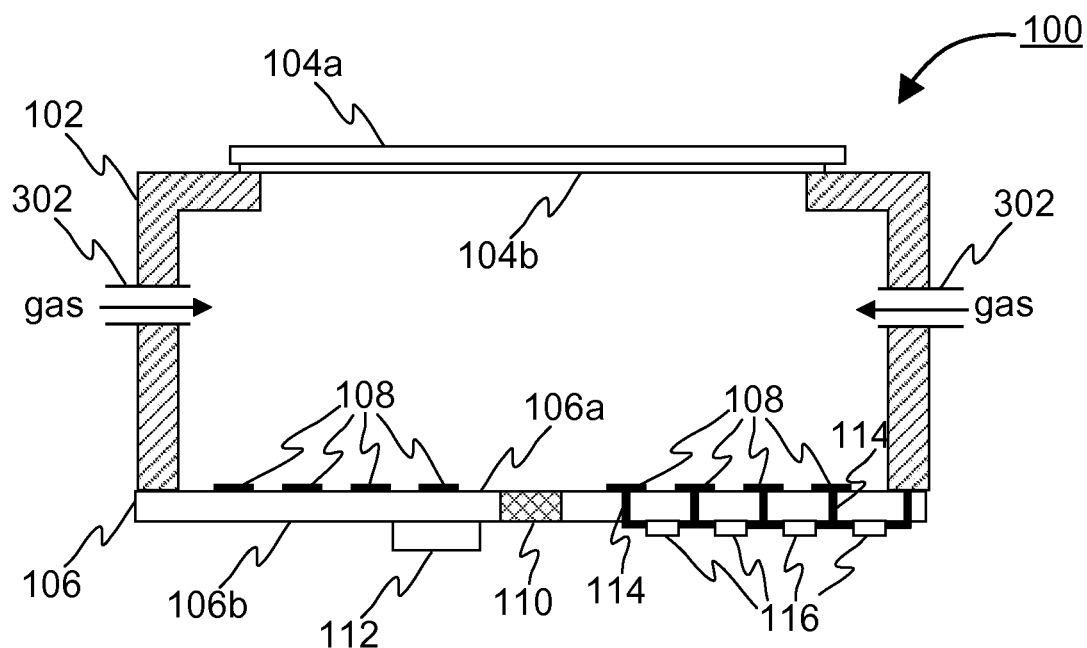
FIG. 3 illustrates schematically an example of implementation of one or more inlets to the chamber of the gas drift detector according to the invention.

According to one embodiment of the invention the chamber may comprise one or more inlets 302 in order to provide the gas inside the housing 102. FIG. 3 illustrates one example of how the one or more inlets 302 may be implemented to the chamber of the gas drift detector 100 according to the invention. The one or more inlets 302 may be at least one of the following: opening, hole, pipe, tube or similar. In the example illustrated in FIG. 3 the chamber comprises two inlets 302 implemented as pipes arranged through the housing 102. Furthermore, in the example illustrated in FIG. 3 the radiation window 104 comprises polymer layer 104a that is coated with aluminium layer 104b on the side of the radiation window 104 facing inside the chamber as describe earlier. Alternatively, the radiation window may 104 comprise one layer as illustrated in FIG. 1.

Figure 4:
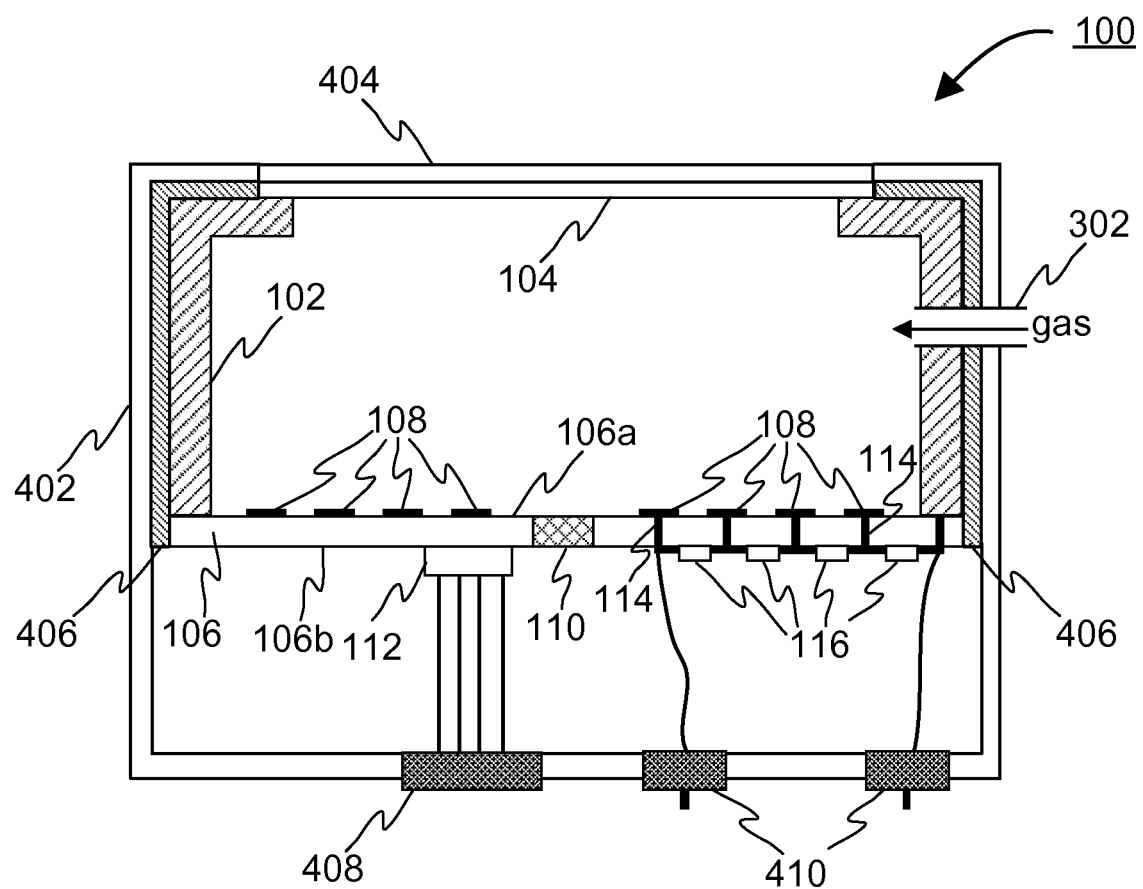
FIG. 4 illustrates schematically an example of the second housing of the gas drift detector according to the invention.

According to one embodiment of the invention the above described gas drift detector 100 may further comprise a second housing 402 for accommodating the chamber of the gas drift detector 100. FIG. 4 schematically illustrates one example of the gas drift detector 100 according invention comprising the second housing 402. The material of the second housing 402 may comprise stainless steel, for example. The second housing 402 comprises a second radiation window 404 arranged substantially at the place of the radiation window 104. The material of the second radiation window 404 may comprise for example one of the following: beryllium, aluminium. An insulating layer 406 may be arranged between the housing 102 and the second housing 402. The material of the insulating layer 406 may comprise Teflon, for example. The second housing 402 may be electrically grounded and hermetically sealed. The second housing 402 may further comprise a connector 408 electrically connected to the amplifier 112 and connectors 410 for biasing the one or more conductive rings 108 and the housing 102.

One advantage of the above described gas drift detector 100 according to the invention is that it may be provided with any active area, i.e. area of the radiation window 104, from tens of $mm^2$ to tens of $cm^2$, or even much larger. Another advantage of the gas drift detector 100 according to the invention is the low noise, i.e. energy resolution, as already described. Thus, the invention enables providing a large-area X-ray detector that has much better energy resolution than any other gas-filled detector and much larger active area than any silicon drift detector. An X-ray detector having large active area and low noise has many useful applications, because large active area enables fast collection times and rapid analysis. This is especially important in applications requiring high count rates, for example in on-line X-ray Fluorescence (XRF) analysis of objects moving fast on conveyor belts (e.g. in mining industry, food production, materials recycling, etc.). Alternatively, the large active area enables a use of weaker and cheaper excitation sources (X-ray tube or isotope source) which may bring great savings to XRF analyzer manufacturers. Furthermore, in space applications the large active area may reduce collection times and thus enabling faster and more efficient X-ray astronomy and astrophysics, when studying faint X-ray sources of the deep space.

Furthermore, the above describe gas drift detector 100 according to the invention is a true room-temperature detector that does not require any cooling, unlike semiconductor detectors, such as silicon drift detectors. This enables a simple design and substantially inexpensive manufacturing costs, even in small quantities. In addition, in the gas drift detector 100 according to the invention has no leakage current, because no leakage current exists in gases, which improves the noise properties, i.e. energy resolution, of the gas drift detector.

The above described gas drift detector 100 according to the invention may be used at the energy range of 30-100 keV, where exists no room-temperature detectors having large active area. Moreover, the silicon drift detectors are not suitable at the energy range of 30-100 keV. Typically at the energy range of 30-100 keV Xenon is used as the gas.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A gas drift detector comprising:
   a chamber formed by:
      a housing having a first end and a second end,
      a radiation window arranged to cover an opening of the first end of the housing, and
      a substrate arranged to cover an opening of the second end of the housing,
   an anode arranged to the substrate,
   one or more conductive rings arranged on a surface of the substrate facing inside the chamber, and
   an amplifier arranged to the opposite surface of the substrate than the conductive rings, wherein the amplifier is electrically connected to the anode,
   wherein the chamber is filled with a gas.

2. The gas drift detector according to claim 1, wherein the amplifier is electrically connected to the anode by means of a bonding wire having length less than 10 mm.

3. The gas drift detector according to claim 1, wherein the gas is one of the following: xenon, krypton, or argon, or a mixture of hydrocarbon and one of the following: xenon, krypton, or argon.

4. The gas drift detector according to claim 1, wherein the chamber comprises one or more inlets for providing the gas inside the housing.

5. The gas drift detector according to claim 1, wherein the material of the radiation window comprises at least one of the following: polymer, aluminium, titanium, beryllium.

6. The gas drift detector according to claim 1, wherein the material of the substrate comprises at least one of the following: alumina, polymer.

7. The gas drift detector according to claim 1, wherein the amplifier is one of the following: FET amplifier, MOSFET amplifier.

8. The gas drift detector according to claim 1, wherein the one or more conductive rings are in a form of concentric rings.

9. The gas drift detector according to claim 1, wherein the one or more conductive rings, the housing, and the radiation window are configured to be biased by means of high negative voltage from −500 V to −300 V and a resistive voltage divider in order to drift electrons created by an X-ray event to the anode and to drift the positively charged ions created by said X-ray event to the negatively biased housing.

10. The gas drift detector according to claim 1, wherein the gas drift detector comprises further a second housing for accommodating the chamber, wherein the second housing is electrically grounded and hermetically sealed.

11. The gas drift detector according to claim 1, wherein the diameter of the anode is less than 0.5 mm.

12. The gas drift detector according to claim 1, wherein the capacitance of the anode is less than 1 pF.

13. The gas drift detector according to claim 1, wherein the anode is encircled with a material having volume resistivity higher or equal to $2 \cdot 10^9$ MΩcm and dielectric constant less or equal to 2.5.

* * * * *